United States Patent

[11] 3,615,444

[72] Inventors Kinji Ohkubo;
Takashi Nakamura, both of Kanagawa, Japan

[21] Appl. No. 652,303
[22] Filed July 10, 1967
[45] Patented Oct. 26, 1971
[73] Assignee Fuji Photo Film Company Ltd. Kanagawa, Japan
[32] Priority July 11, 1966
[33] Japan
[31] 41/45258
Pat. 42-3651

[54] COLOR COUPLER AS OLEOPHILLIC FORMING AGENT IN LITHOGRAPHIC PROCESS
30 Claims, 9 Drawing Figs.

[52] U.S. Cl. .......... 96/33, 96/100
[51] Int. Cl. .......... G03f 7/02
[50] Field of Search .......... 96/33, 29 L, 100; 101/466

[56] References Cited

UNITED STATES PATENTS 2,362,598 11/1944 Vittum et al. .......... 95/6
Re.25,885 10/1965 Yackel et al. .......... 96/33

*Primary Examiner*—J. Travis Brown
*Assistant Examiner*—Won H. Louie, Jr.
*Attorney*—Sughrue, Rothwell, Mion, Zinn & MacPeak

ABSTRACT: A process for preparing a lithographic printing master by exposing a lithographic printing plate having a silver halide light-sensitive layer containing a nontanning agent and an oleophilic image-forming agent, and processing the layer to provide an oleophilic property to the exposed areas.

Figure 1:
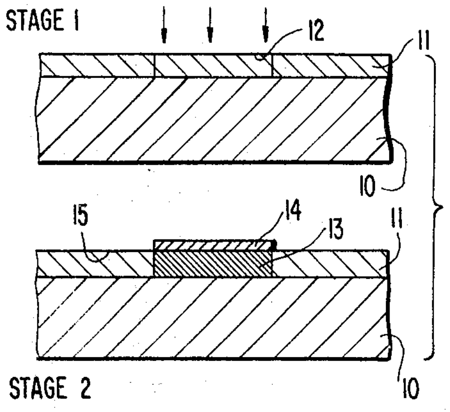

One or both of the additives may be incorporated in the processing bath.

PATENTED OCT 26 1971 3,615,444

*INVENTORS*
KINJI OHKUBO
TAKASHI NAKAMURA

BY Sughrue, Rothwell, Mion, Zinn & Macpeak
*ATTORNEYS*

*INVENTORS*
KINJI OHKUBO
TAKASHI NAKAMURA

BY Sughrue, Rothwell, Mion, Zinn & Macpeak
*ATTORNEYS*

COLOR COUPLER AS OLEOPHILLIC FORMING AGENT IN LITHOGRAPHIC PROCESS

BACKGROUND OF THE INVENTION

1. Field of the Invention

This invention relates to a process for preparing a lithographic printing plate using a photographic silver halide emulsion.

By the term "oleophilic image-forming agent" in this specification and in the claiming cluases hereof, we mean a compound capable of forming an oleophilic image by reaction with an oxidation product of a developing agent.

2. Description of the Prior Art

A great many processes have been suggested for preparing lithographic printing plates. A well-known process involves forming an oleophilic image on a hydrophilic surface by photographic means, e.g., by exposing to radiation and thereby differentially hardening light-sensitive organic colloid layer coated on a support and then removing the unexposed and nonhardened areas to leave the oleophilic areas. Another process consists in exposing to radiation and thereby differentially hardening a light-sensitive organic colloid layer coated on a support and then transferring the nonexposed and nonhardened areas to another receiving sheet to leave an oleophilic pattern on the surface of a receiving sheet. A third process consists in exposing to radiation a light-sensitive gelatino-silver halide layer coated on a support and then subjecting to tanning development, whereby to tan the gelatin in the exposed areas and to provide the oleophilic areas on the said layer.

In any case, the lithographic printing plate is obtained by forming an oleophilic pattern on a hydrophilic plate surface.

SUMMARY OF THE INVENTION

An object of the invention is to provide a process for preparing a novel lithographic printing plate.

Another object of the invention is to provide a method of obtaining a lithographic plate by treatment in several baths after exposure. of the invention is to provide a process for preparing a lithographic printing plate having a high sensitivity.

Still another object of the invention will appear hereinafter.

This invention consists of exposing to radiation a silver halide emulsion layer whose surface is hydrophilic and then developing the exposed layer, thereby forming an oleophilic image on the surface of said silver halide emulsion layer through the reaction of an oleophilic image forming agent and oxidation product of a developing agent and providing a lithographic printing plate having an oleophilic image on the hydrophilic surface thereof.

The silver halide emulsion layer whose surface is hydrophilic is prepared by applying to a support of paper, film or metal plate, a suspension of fine crystal silver chloride, silver bromide, silver chlorobromide, silver iodobromide or silver chlorobromide containing a small amount of silver iodide in a binder such as gelatin, polyvinyl alcohol, polyvinyl-pyrrolidone, other natural or synthetic polymer or their mixture.

Suitable for use as the developing agent in the process of our invention are p-aminophenol, p-phenylenediamine and their derivatives, for example, 4-amino-N,N-diethylaniline, 4-amino-3-methyl-N,N-diethylaniline and 4-amino-3-methyl-N-ethyl-N-(B-methylsulfonamidoethyl)-aniline.

Suitable for use as the oleophilic image forming agent in the process of our invention are phenol, phenol derivatives, α-naphthol, α-naphthol derivatives, acetanilides and pyrazolones, in particular. 2-(2′, 4′-di-t-amylphenoxyacetamid)-4, 6-dichloro-5-methylphenol is typical of the phenol derivative. 2,4-dichloro-5-P-toulenesulfonamido-1-naphthol, N-[2-Co- 2-(o- acetamido phenyl)ethyl] -1-hydroxy-2-naphthamide and N-n-dodecyl-1hydroxy-4-chloro-2-naphtamide are typical of the α-naphthol. 3-benzoylacetoamino-4-methoxy-dodecylbenzoate is typical of the acetanilides. 1-(2′, 4′, 6′-trichlorophenyl)-3-[β-(N-t-butyl-N-pentadecanoyl)-propionamido] -5-pyrazolone, 1-2′, 4′, 6′-trichlorophenyl)-3-[3″- (2‴, 4‴-di-t-amylphenoxyacetamido)-benzamido]-5-pyrazolone, 1-(2′, 6′-dichloro-4′-methylphenyl)-3-t-amylphenoxyacetamido) ′ benzamido)]-5-pyrazolone, 1-(2,4,6-trichlorophenyl)-3-p-nitroanilino-5-pyrazolone and 1-phenyl-3-p-chlorobenzamido-5-pyrazolone are typical of the pyrazolones. These compounds are well known as couplers or color-forming agents in color photography.

Various embodiments are possible in carrying out the process of our invention, some of which will become apparent from the following description and drawings, in which:

FIGS. 1 to 9 are schematic representations of nine embodiments of our invention, more specifically, FIG. 1 to FIG. 4 showing negative-positive processes and FIG. 5 to FIG. 9 positive-positive processes.

In FIG. 1, layer 10 of the element of stage 1 representing a support such as paper and film is coated with silver halide emulsion layer 11 containing nontanning developing agent. The surface of the element is hydrophilic. An area 12 of the element is exposed to light.

After exposure of the element, it is developed in an alkaline bath containing the oleophilic image forming agent, immersed in a stop bath and then inked, thereby leading to stage 2 of FIG. 1. In area 13, an oleophilic image is formed by reaction of the oxidation product of the developing agent and oleophilic image forming agent and an ink image 14 is formed, while undeveloped area 15 is remained hydrophilic and is repellent of printing ink when moistened with water.

Figure 2:
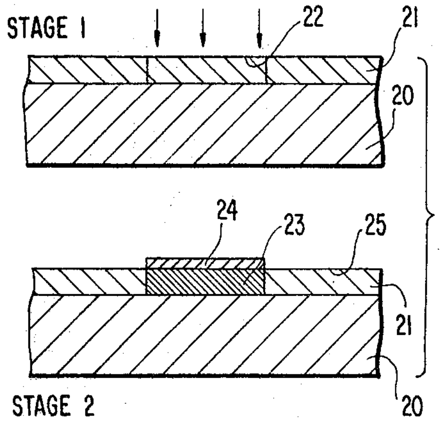

In stage 1 of FIG. 2, a support 20 such as paper and film is coated with silver halide emulsion layer 21. The surface of the element is hydrophilic. An area 22 of the element is exposed to light.

After exposure of the element, it is developed in an alkaline bath containing nontanning developing agent and oleophilic image forming agent, immersed in a stop bath and then inked, thereby leading to stage 2 of FIG. 2. In area 23, an oleophilic image is formed by reaction of the oxidation product of the developing agent and oleophilic image forming agent, and ink image 24 is formed, while undeveloped area 25 remains hydrophilic and is repellent of printing ink when moistened with water.

Figure 3:
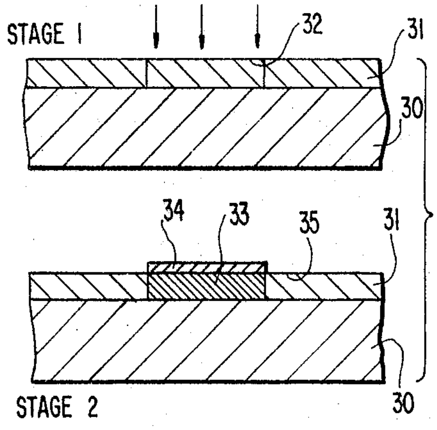

In stage 1 of FIG. 3, a support 30 such as paper and film is coated with silver halide emulsion layer 31 containing nontanning developing agent and oleophilic image-forming agent. The surface of the element is hydrophilic. An area 32 of the element is exposed to light.

After exposure of the element, it is developed in an alkaline bath, immersed in a stop bath and then inked, thereby leading to stage 2 of FIG. 3. In area 33, an oleophilic image is formed by reaction of the oxidation product of the nontanning developing agent with the oleophilic image-forming agent and ink image 34 is provided, while undeveloped area 35 remains hydrophilic and is repellent of printing ink when moistened with water.

Figure 4:
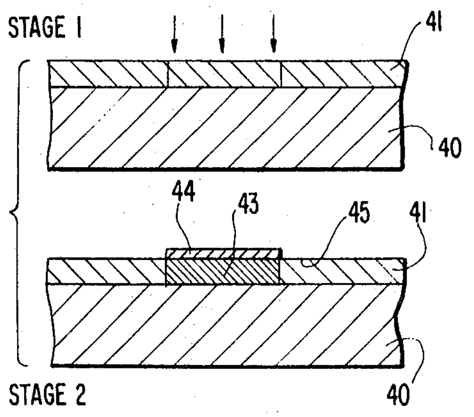

In stage 1 of FIG. 4, a support 40 such as paper and film is coated with silver halide emulsion layer 41 containing the oleophilic image-forming agent. The surface of the element is hydrophilic. An area 42 of the element is exposed to light.

After exposure of the element, it is developed in an alkaline bath containing nontanning developing agent, immersed in a stop bath and then inked, thereby leading to stage 2 of FIG. 4. In area 43, an oleophilic image is formed by reaction of the oxidation product of the nontanning developing agent with the oleophilic image forming agent and ink image 44 is formed, while undeveloped area 45 remains hydrophilic and is repellent of printing ink when moistened with water.

Figure 5:
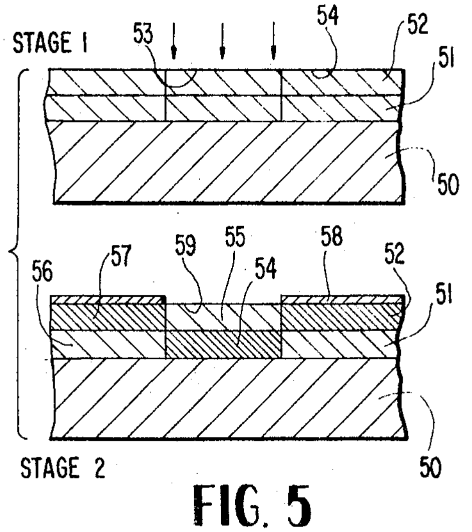

In stage 1 of FIG. 5, a support 50 such as paper and film is coated with silver halide emulsion layer 51 containing nontanning developing agent and with fogged silver halide emulsion layer 52 in order. The surface of the element is hydrophilic. An area 53 of the element is exposed to light.

After exposure of the element, it is developed in an alkaline bath containing the oleophilic image-forming agent, immersed in a stop bath and then inked, thereby leading to stage 2 of FIG. 5. In exposed area 54 of layer 51, the development is effected and an oleophilic image is formed by reaction of the oxidation product of the nontanning developing agent with the oleophilic image forming agent, resulting in consumption of the developing agent in layer 51. Consequently, there occurs no change in exposed area 55 of layer 52. On the other hand, since the development is not carried out in nonexposed area 56 of layer 51, the developing agent not utilized there diffuses farther and reaches nonexposed area 57 of layer 52, where the development is effected. There is thus formed an oleophilic image by reaction of the oxidation product of the nontanning developing agent with the oleophilic image-forming agent in area 57 and an ink image 58 is formed thereon, while exposed area 59 remains hydrophilic and is repellent to printing ink when moistened with water.

Figure 6:
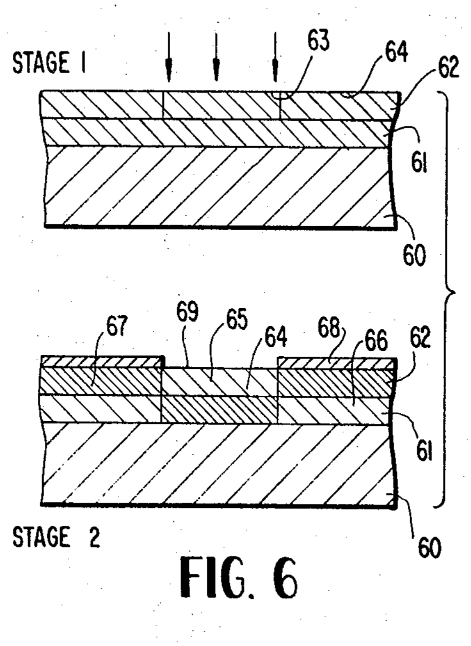

In stage 1 of FIG. 6, a support 60, such as paper and film, is coated with silver halide emulsion layer 61 containing a nontanning developing agent and with a fogged silver halide emulsion layer 62 containing an oleophilic image forming agent. The surface of the element is hydrophilic. An area 63 of the element is exposed to light.

After exposure of the element, it is developed in an alkaline bath, immersed in a stop bath and then inked, thereby leading to stage 2 of FIG. 6. In exposed area 64 of layer 61, the development is carried out and the developing agent is consumed. Consequently, there occurs no change in exposed area 65 of layer 62. On the other hand, since the development is not carried out in nonexposed area 66 of layer 61, the developing agent not utilized there diffuses farther and reaches nonexposed area 67 of layer 62, where the development is carried out. There is thus formed an oleophilic image by reaction of the oxidation product of the nontanning developing agent with the oleophilic image forming agent in area 67 and an ink image 68 is formed thereon, while exposed area 69 remains hydrophilic and is repellent to printing ink when moistened with water.

Figure 7:
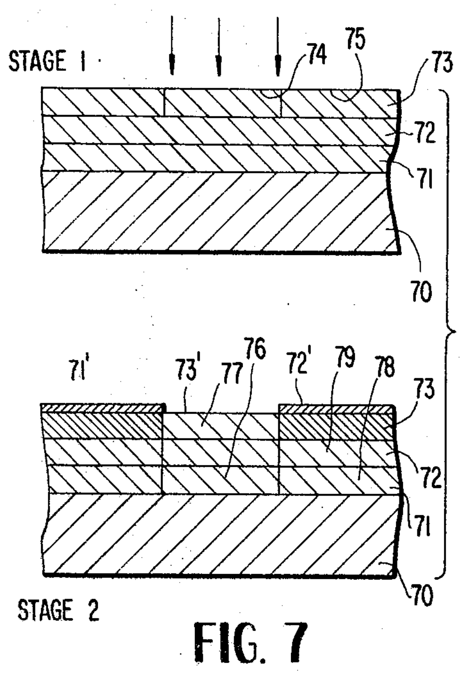

In stage 1 of FIG. 7, a support 70 such as paper and film is coated with silver halide emulsion layer 71 containing a nontanning developing agent, fogged silver halide emulsion layer 72 and gelatin layer 73 containing the oleophilic image-forming agent in order. An area 74 of the element is exposed to light.

After exposure of the element it is developed in an alkaline bath, immersed in a stop bath and then inked, thereby leading to stage 2 of FIG. 7. In exposed area 76 of layer 71, the development is carried out and the developing agent is consumed. Consequently, there occurs no change in exposed area 77 of layer 73. On the other hand, the development is not carried out in nonexposed area 78 of layer 71, so the nontanning developing agent not utilized there diffuses farther and reaches nonexposed area 79 of layer 72, where the development is carried out. There is thus formed the oxidation product of the developing agent in part 79, which diffuses farther through the layer and reaches nonexposed area 71' of layer 73, where an oleophilic image is formed by reaction of the oxidation product of the developing agent with the oleophilic image forming agent and ink image 72' is formed thereon, while exposed part 73' remains hydrophilic and is repellent to printing ink when moistened with water.

Figure 8:
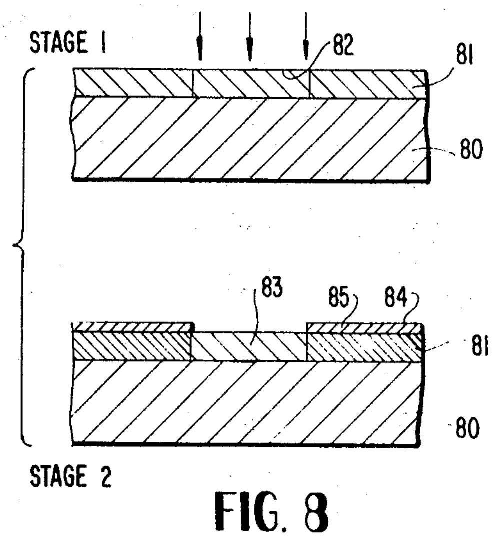

FIG. 8 illustrates a positive-positive process by four baths.

In stage 1 of FIG. 8, a support 80 such as paper and film is coated with silver halide emulsion layer 81. The surface of the element is hydrophilic. An area 82 of the element is exposed to light.

After exposure of the element, it is processed in a first nontanning developing solution, washed with water, processed in an alkaline solution containing a fogging agent of silver halide, second developing agent and oleophilic image forming agent (i.e., compound capable of forming an oleophilic image by reaction with the oxidation product of the second developing agent, immersed in a stop bath and then inked, thereby leading to the stage 2 of FIG. 8. In exposed area 83 of layer 81, the development is carried out by the first developing agent and there is formed no oleophilic image, so area 82 remains hydrophilic and repellent to printing ink when moistened with water. In nonexposed area 84 of layer 81, on the other hand, the development is carried during the second developing, an oleophilic image is formed by reaction of the oxidation product of the second developing agent and oleophilic image-forming agent and ink image 85 is formed.

In the foregoing method, the steps of water washing and stopping may be omitted if selecting the condition suitably. Such two bath method will appear in example 8.

Figure 9:
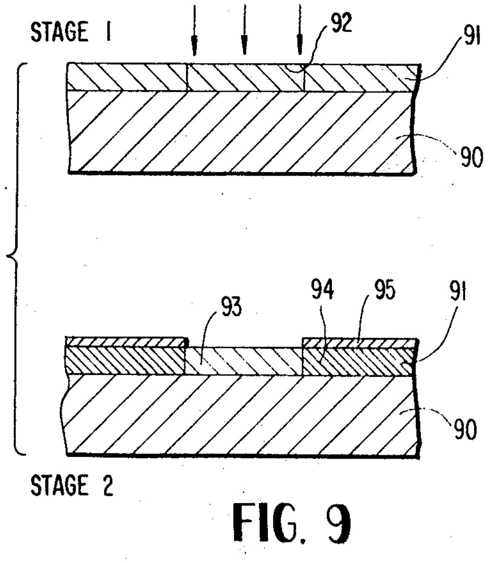

FIG. 9 illustrates a positive-positive process by four baths.

In the stage 1 of FIG. 9, a support 90 such as paper and film is coated with silver halide emulsion layer 91 containing a first nontanning developing agent. The surface of the element is hydrophilic. An area 92 of the element is exposed to light.

After exposure of the element, it is processed in an alkaline bath, washed with water, processed in an alkaline bath containing a fogging agent of silver halide, a second developing agent and an oleophilic image-forming agent (i.e., a compound capable of forming an oleophilic image by reaction with the oxidation product of the second developing agent), immersed in a stop bath and then inked, thereby leading to stage 2 of FIG. 9. In exposed area 93 of layer 91, the development is carried out by the first developing agent, and there is formed no oleophilic image, so area 92 remains hydrophilic and repellent to printing ink when moistened with water. In nonexposed area 94 of layer 91, on the other hand, the development is carried during the second developing, an oleophilic image is formed by reaction of the oxidation product of the second developing agent and oleophilic image-forming agent and ink image 95 is formed.

In this method also, the steps of water washing and stopping may be omitted if the conditions are suitably selected. Such a two bath method will be illustrated in example 9.

It is a very interesting fact that, although a silver halide emulsion layer containing no additive as well as a silver halide emulsion layer containing either or both developing agent and an oleophilic image-forming agent has surfaces hydrophilic and repellent to printing ink when moistened with water, the surface of the element becomes oleophilic after there is once formed an oleophilic image (dye) in the emulsion layer by reaction of the oxidation product of the developing agent and oleophilic image-forming agent (color-forming agent). The present invention may be considered to be an industrial application of this experimental fact in the production of lithographic printing plate.

Advantages of the method of making a lithographic printing plate according to our invention are the following: firstly, the sensitivity of our printing plate can be raised properly to such an extent as those found in the conventional printing paper for enlarging and the negative film for photography by the known sensitizing method of silver halide emulsion, since it depends upon the sensitivity of silver halide emulsion. Secondly, a lithographic printing plate can be obtained by subjecting the element to only several bath processings of development and stopping and other treatments after exposure, resulting in the saving of the cost of apparatus and in the simplification of the operation. Thirdly, there can be obtained a negative-positive process plate as well as a positive-positive process plate in the method of our invention.

The following examples are given in order to illustrate the invention:

EXAMPLE 1

(Cf. FIG. 1, negative-positive process)

To 100 g. of a photographic emulsion containing 5.4 g. of gelatin and 9.3 g. of silver chlorobromide (silver bromide 30 mol) percent were added 1.6 g. of 4-amino-3-methyl-N-ethyl-N-(β-methylsulfonamidoethyl) aniline, (as the nontanning developing agent) and 8 mol of aqueous 6 percent formaldehyde solution, coated onto a waterproof paper to yield a coating having 83 ml. of the resulting emulsion per m.$^2$, and dried to give a printing element.

After exposure of the element, it was processed in a developing solution of the following composition at 30° C., for 5 minutes.

| | |
|---|---|
| Aqueous 10 percent caustic solution | 3.4 ml. |
| 2-(2',4'-di-t-amylphenoxyacetamido)-4,6-dichloro-5-methylphenol (tetrahydrofuran 10% solution) (as the oleophilic image-forming agent) | 30 ml. |
| Water to 1,000 ml. | |

After developing, it was immersed in a stopping solution of the following composition for 5 seconds to obtain a lithographic printing plate.

| | |
|---|---|
| Orthophosphoric acid | 8 g. |
| Benzyl alcohol | 5 g. |
| Water to 1,000 ml. | |

EXAMPLE 2

(Cf. FIG. 2, negative-positive process)

To 100 g. of a photographic emulsion containing 5.7 g. of gelatin and 22 g. of silver bromide was added 2 ml. of aqueous 6 percent formaldehyde solution, coated onto a waterproof paper to yield a coating having 83 ml. of the resulting emulsion per m.$^2$, and dried to prepare a printing element.

After exposure of the element, it was processed in a developing solution of the following composition at 30° C., for 40 seconds.

| | |
|---|---|
| Anhydrous sodium sulfite | 10 g. |
| 4-amino-N,N-diethylaniline (as the nontanning developing agent) | 1.5 g. |
| Aqueous 10% caustic soda solution | 34 ml. |
| 1-(2',4',6'-trichlorophenyl)-3-[3''-2''',4'''-di-t-amylphenoxyacetamido)-benzamido]-5-pyrazolone (tetrahydrofuran 10% solution)(as the oleophilic image-forming agent) | 30 ml. |
| Water to 1,000 ml. | |

After developing, it was immersed in the stopping solution of example 1 for 5 seconds to obtain a lithographic printing plate.

EXAMPLE 3

(Cf. FIG. 3, negative-positive process)

To 100 g. of a photographic emulsion containing 5.4 g. of gelatin and 9.3 g. of silver chlorobromide (silver bromide 30 mol %) were added 2 g. of 4-amino-3-methyl-N,N-diethylaniline, (as the nontanning developing agent) 10 ml. of aqueous 6% saponin solution, 5.8 ml. of aqueous 2% mucochloric acid, 1 ml. of aqueous 5% sodium carbonate (anhydrous) solution and 20 ml. of tetrahydrofuran 10% 2,4-dichloro-5-(p-toluenesulfonylamino)-1-naphthol (as the oleophilic image-forming agent) solution, coated onto a film support to yield a coating having 100 ml. of the resulting emulsion per m.$^2$, and dried to prepare a printing element.

After exposure of the element, it was processed in a developing solution of the following composition at 20° C., for 10 minutes.

| | |
|---|---|
| Potassium Orthophosphate | 30 g. |
| Sodium Orthophosphate, 12-hydrate | 60 g. |
| Potassium chloride | 1.5 g. |
| Water to 1,000 ml. | |

After the developing, it was immersed in the stopping solution of example 1 for 5 seconds to obtain a lithographic printing plate.

EXAMPLE 4

(Cf. FIG. 4, negative-positive process)

To 100 g. of a photographic emulsion containing 6.5 g. of gelatin and 7.2 g. of silver chlorobromide (silver bromide 30 mol %) were added 5 ml. of aqueous 6% saponin solution, 5.8 ml. of aqueous 2% mucochloric acid, 1 ml. of aqueous 5% sodium carbonate (anhydrous) solution, and 3 ml. of 10% 1-phenyl-3-p-chlorobenzamido-5-pyrazolone (as the oleophilic image-forming agent) tetrahydrofuran solution, coated onto a film support to yield a coating having 110 ml. of the resulting emulsion per m.$^2$ and dried to prepare a printing element. After exposure of the element, it was processed in a developing solution of the following composition at 20° C., for 40 seconds:

| | |
|---|---|
| 4-amino-3-methyl-N-ethyl-N-(β-methylsulfonamidoethyl)-aniline developing agent) | 1.5 g. |
| Anhydrous sodium sulfite 5 g. | |
| Aqueous 10% caustic soda solution | 34 ml. |
| Water to 1,000 ml. | |

After the developing, it was immersed in the stopping solution of example 1 for 5 seconds to obtain a lithographic printing plate.

EXAMPLE 5

(Cf. FIG. 5, positive-positive process)

To 100 g. of a photographic emulsion containing 12.5 g. of gelatin and 4.0 g. of silver chloride were added 1 g. of 4-amino-3-methyl-N,N-diethyl-aniline (as the nontanning developing agent), 0.4 ml. of 1 N sulfuric acid and 8 ml. of aqueous 6% formaldehyde solution, and coated onto a waterproof paper to yield a coating having 130 ml. of the resulting emulsion per m.$^2$.

To the thus resulting coating was further applied to yield a coating having 2o ml./m. of a mixture obtained by adding 6 ml. of 1 N caustic soda solution and 3 ml. of aqueous 1% hydrazine hydrochloride solution to 100 g. of a photographic emulsion containing 5.4 g. of gelatin and 9.3 g. of silver chlorobromide (silver bromide 30 mol %), heating at 40° C., for 40 minutes so as to fog the silver chlorobromide and then adding thereto 5.8 ml. of 1 N sulfuric acid solution, 10 ml. of aqueous 6% saponin solution and 4 ml. of aqueous 6% formaldehyde solution, and dried to prepare a printing element.

After exposure of the element, it was processed in a developing solution of the following composition at 30° C., for 20 seconds:

Aqueous 10% caustic soda solution 34 ml.

3-benzoylacetamino-4-methoxy-dodecyl-benzoate (tetrahydrofuran 10% solution ) (as the oleophilic image forming agent) (10$^2$) 30 ml.

Water to 1,000 ml.

After developing, it was immersed in the stopping solution of example 1 for 5 seconds to give a lithographic printing plate.

EXAMPLE 6

(Cf. FIG. 6, positive-positive process)

To 100 g. of a photographic emulsion containing 12.5 g. of gelatin and 3.4 g. of silver chloride were added 1.5 ml. of ml. of 1 N caustic soda solution and 2 ml. of 4-amino-N,N-diethylaniline, 0.4 ml. of 1 N sulfuric acid solution and 8 ml. of aqueous 6% formaldehyde solution and coated onto a waterproof paper to yield a coating having 130 ml. of the resulting emulsion per m.$^2$. To the thus resulting coating was further applied to yield a coating having 30 ml./m.$^2$ of a mixture obtained by adding 4.5 ml. of 1 N caustic soda solution and 2 ml. of aqueous 1% hydrazine hydrochloride solution to 100 g. of a photographic emulsion containing 12.5 g. of gelatin and 3.4 g. of silver chloride, heating at 40° C., for 40 minutes to fog the silver chloride and then adding thereto 4.3 ml. of 1 N sulfuric acid solution, 50 ml. of water, 10 ml. of aqueous 6% saponin solution, 4 ml. of aqueous 6% formaldehyde solution and 20 ml. of 10% N-(o-acetamidephenyl ethyl)-1-hydroxy -2-naphthamide (as the oleophilic image forming agent) tetrahydrofuran solution, and dried to prepare a printing element.

After exposure of the element, it was processed in the developing solution of example 3 at 20° C., for 40 seconds and then immersed in the stopping solution of example 1 for 5 seconds to obtain a lithographic printing plate.

EXAMPLE 7

(Cf. FIG. 7, positive-positive process)

To 100 g. of a photographic emulsion containing 5.4 g. of gelatin and 9.3 g. of silver chlorobromide (silver bromide 30 mol %), were added, 2.5 g. of 4-amino-3-methyl-N-ethyl-N-(β-methylsulfonamidoethyl)-aniline, (as the nontanning developing agent) 1 ml. of 1 N sulfuric acid solution and 8 ml. of aqueous 6% formaldehyde solution, and coated onto a waterproof paper to yield a coating having 83 ml. of the resulting emulsion per m.$^2$. To the resulting coating was further applied as a second layer in a proportion of 30 ml./m.$^2$ of a mixture obtained by adding 6 ml. of 1 N caustic soda solution and 3 ml. of aqueous 1% hydrazine hydrochloride solution to 100 g. of the same silver chlorobromide emulsion as mentioned above, heating at 40° C., for 40 minutes to fog the silver chlorobromide and then adding thereto 5.5 ml. of 1 N sulfuric acid, 1,5 ml. of aqueous 6% saponin solution and 4 ml. of aqueous 6% formaldehyde. solution. Onto the thus resulting second layer was further applied as a third layer in a proportion of 30 ml./m.$^2$ of a mixture obtained by adding 10 ml. of aqueous 6% saponin solution and 15 ml. of 10% 1-(2,4,6-trichlorophenyl)-3-p-nitroanilino-5-pyrazolone (as the oleophilic image-forming agent) aqueous tetrahydrofuran solution to 100 ml. of an aqueous 3% gelatin solution, and dried to give a printing element.

After exposure of the element it was processed in aqueous 0.34% caustic soda solution at 20° C., for 2 minutes.

After the developing, it was immersed in a stopping solution of the following composition for 30 to 60 seconds to obtain a lithographic printing plate.

| | |
|---|---|
| Phosphoric acid | 3 g. |
| Benzyl alcohol | 2 g. |
| Water to 1,000 ml. | |

EXAMPLE 8

(Cf. FIG. 8, positive-positive process)

2 ml. of aqueous 6% formaldehyde solution was added to 100 g. of a photographic emulsion containing 9.6 g. of gelatin and 2.6 g. of silver chloride coated onto a waterproof paper to yield a coating having 105 ml. of the resulting emulsion per m.$^2$ and dried to prepare a printing element.

After exposure of the element, it was processed in a first developing solution of the following composition at 20° C., for 3 minutes:

| | |
|---|---|
| p-methylaminophenol | 17 g. |
| anhydrous sodium sulfite | 20 g. |
| 1N caustic soda | 50 ml. |
| water to 1,000 ml. | |

After the first developing, it was rinsed with water for 30 to 60 seconds and then processed in a second developing solution of the following composition at 30° C., for 20 seconds:

| | |
|---|---|
| Anhydrous sodium sulfite | 10 g. |
| 4-amino-N,N-diethylaniline (as the nontanning developing agent | 1.5 g. |
| Aqueous 10% caustic soda solution | 34 ml. |
| 1-(2',4',6'-trichlorophenyl-3-[β (N-t-butyl-N-pentadecanoyl)-propionamido]-5-pyrazolone (as the oleophilic image-forming agent) (tetrahydrofuran 10% solution) | 30 ml. |
| Ethylenediamine | 5 ml. |
| Water to 1,000 ml. | |

After the second developing, the developed element was immersed in the stopping solution of example 7 for 30 to 60 seconds to obtain a lithographic printing plate. Even if the water rinsing after the first developing and the stopping after the second developing are omitted, the lithographic printing plate can be obtained although the quality of print lowers somewhat.

EXAMPLE 9

(Cf. FIG. 9, positive-positive process)

To 100 g. of a photographic emulsion containing 5.4 g. of gelatin and 7.8 g. of silver chlorobromide (silver bromide 30 mol %) were added 1.8 g. of 1-phenyl-3-pyrazolidone, 0.5 ml. of aqueous 1% sodium 13-(p-nonylphenoxy)-5,8,11-trioxa-tridecanoyl-1-sulfonate solution, 0.3 ml. of aqueous 6% saponin solution and 5 ml. of aqueous 6% formaldehyde solution, coated onto a waterproof paper to yield a coating having 83 ml. of the resulting emulsion per m.$^2$, and dried to give a printing element.

After exposure of the element, it was processed in an aqueous 0.34% caustic soda solution at 20° C., for 3 minutes, rinsed with water for 30 to 60 seconds and then developed in a second developing solution of the following composition at 30° C., for 20 seconds.

| | |
|---|---|
| Anhydrous sodium sulfite | 10 g. |
| 4-amino-3-methyl-N,N-diethylaniline (as the nontanning developing agent | 1.5 g. |
| Aqueous 10% caustic soda solution | 34 ml. |
| 1-(2',4',6'-trichlorophenyl)-3-[(β-(N-t-butyl-N-pentadecanoyl) propionamide)]-5-pyrazolone (tetrahydrofuran 10% solution) (as the oleophilic image-forming agent | 30 ml. |
| Ethylenediamine | 5 ml. |

After the second developing, it was immersed in the stopping solution of example 1 for 30–60 seconds to obtain a lithographic printing plate.

Even if the water rinsing after the first developing and the stopping after the second developing are omitted, the lithographic printing plate can be obtained although the quality of print lowers somewhat. The resultant plate is printed on a lithographic printing press, the ink being repelled by the hydrophilic surface of the plate but readily accepted by the oleophilic areas.

When the printing plate obtained in any preceding example was used in an offset printing machine, 1,000 or more of sharp prints were obtained.

What is claimed is:

1. A lithographic printing process which comprises (1) exposing to a subject a light-sensitive lithographic printing plate comprising a support having thereon a silver halide emulsion layer whose surface is hydrophilic; (2) developing said exposed emulsion layer to form on said emulsion layer oleophilic image areas receptive to greasy printing ink; (3) inking the image areas of said emulsion layer with greasy printing ink; and (4) printing therefrom, said process being further characterized in that a nontanning developing agent and a color coupler selected from the class consisting of phenol, phenol derivatives, α-naphthol, α-naphthol derivatives, acetanilides and pyrazolones are incorporated in at least one of the materials selected from the group consisting of a processing solution and a layer provided on said lithographic printing plate, said color coupler forming the oleophilic image areas by reaction with the oxidation product of said developing agent.

2. The process as claimed in claim 1, wherein said nontanning developing agent is incorporated in the silver halide emulsion layer on said lithographic printing plate and wherein the exposed emulsion layer is developed with an aqueous alkaline solution containing said color coupler.

3. The process as claimed in claim 1, wherein said nontanning developing agent and said color coupler are incorporated in an aqueous alkaline processing solution.

4. The process as claimed in claim 1, wherein said nontanning developing agent and said color coupler are incorporated in said emulsion layer.

5. The process as claimed in claim 1, wherein said color coupler is incorporated in said emulsion layer and wherein the nontanning developing agent is incorporated in an aqueous alkaline processing solution.

6. The process as claimed in claim 1, wherein said emulsion layer is an unfogged silver halide emulsion layer, wherein a fogged silver halide emulsion layer is coated on said unfogged emulsion layer, wherein said nontanning developing agent is incorporated in said unfogged emulsion layer, and wherein said color coupler is incorporated in an aqueous alkaline processing solution.

7. The process as claimed in claim 1, wherein said emulsion layer is an unfogged silver halide emulsion layer, wherein a fogged silver halide emulsion layer is coated on said unfogged silver halide emulsion layer, wherein said nontanning developing agent is incorporated in said unfogged emulsion layer, and wherein said color coupler is incorporated in said fogged emulsion layer.

8. The process as claimed in claim 1, wherein said emulsion layer is an unfogged silver halide emulsion layer, wherein a fogged silver halide emulsion layer is coated on said unfogged emulsion layer, wherein a layer is coated on said fogged silver halide emulsion layer, wherein said nontanning developing agent is incorporated in said unfogged silver halide emulsion layer and wherein said color coupler is incorporated in said layer.

9. The process as claimed in claim 1, wherein said development is with a developer containing a nontanning developing agent, wherein said development is followed by a washing of the layer with water and a second development with an alkaline solution containing a second nontanning developing agent and incorporating the color coupler, said oleophilic image-forming agent forming said oleophilic image areas by reacting with the oxidation product of said second nontanning developing agent.

10. The process as claimed in claim 1, wherein said nontanning developing agent is incorporated in said emulsion layer, wherein said development is with an alkaline solution, wherein said development is followed by a washing of the emulsion layer with water and a second development with an alkaline solution containing a second nontanning developing agent and said color coupler, said color coupler forming said oleophilic image areas by reacting with the oxidation product of said second nontanning developing agent.

11. The process as claimed in claim 1 wherein said pyrazolones are selected from the group consisting of 1-(2′,4′,6′-trichlorophenyl)-3-[β-(N-t-butyl-N-pentadecanoyl)-propionamido]-5-pyrazolone, 1-(2′,4′,6′-truchlorophenyl)-3-[3″-(2‴, 4‴-di-t-amylphenoxyacetamido)benzamido)] - 5 - pyrazolone,, 1-(2′, 6′-dichloro-4′-methylphenyl)-3-[3″-(2‴, 4‴-di-t-amylphenoxyacetamido)benzamido] - 5 - pyrazolone, 1-phenyl-3-p-chlorobenzamido-5-pyrazolone, and 1-(2,4,6-trichlorophenyl)-3-nitroanilino-5-pyrazolone.

12. The process as claimed in claim 9 wherein said pyrazolones are selected from the group consisting of 1-(2′,4′,6′-trichlorophenyl)-3-[β-(N-t-butyl-N-pentadecanoyl)-propionamido]-5-pyrazolone, 1-(2′,4′,6′-trichlorophenyl)-3-[3″-(2‴, 4‴-di-t-amylphenoxyacetamido)benzamido]-5-pyrazolone, 1-(2′, 6′-dichloro-4′-methylphenyl)-3-[3″-(2‴, 4‴ - di - t - amylphenoxyacetamido)benzamido] - 5 - pyrazolone, 1-phenyl-3-p-chlorobenzamido-5-pyrazolone and 1-(2,4,6-trichlorophenyl)-3-p-nitroanilino-5-pyrazolone.

13. The process as claimed in claim 10 wherein said pyrazolones are selected from the group consisting of 1-(2′,4′,6′-trichlorophenyl)-3-[β-(N-t-butyl-N-pentadecanoyl)propionamide]-5-pyrazolone, 1-(2′,4′,6′-trichlorphenyl)-3-[3″-(2‴,4‴-di-t-amylphenoxyacetamido)benzamido]-5-pyrazolone, 1-(2′,6′-dichloro-4′-methylphenyl)-3-[3″-(2‴,4‴-di-t-amylphenoxyacetamido)benzamido]-5-pyrazolone, 1-phenyl-3-p-chlorobenzamido-5-pyrazolone and 1-(2,4,6-trichlorophenyl)-3-p-nitroanilino-5-pyrazolone.

14. The process as claimed in claim 1 wherein said nontanning developing agent is selected from the class consisting of p-aminophenol, p-phenylenediamine and derivatives of p-phenylenediamine.

15. The process as claimed in claim 9 wherein said second nontanning agent is selected from the class consisting of p-aminophenol, p-phenylenediamine and derivatives of p-phenylenediamine.

16. The process as claimed in claim 10 wherein said second nontanning developing agent is selected from the class consisting of p-aminophenol, p-phenylenediamine and derivatives of p-phenylenediamine.

17. The process as claimed in claim 11 wherein said derivative of p-phenylenediamine is selected from the class consisting of 4-amino-N,N-diethylaniline, 4-amino-3-methyl-N,N-diethylaniline and 4-amino-3-methyl-N-ethyl-N-(β-methylsulfonamidoethyl)-aniline.

18. The process as claimed in claim 9, wherein said first nontanning developing agent is selected from the class consisting of p-methylaminophenol and 1-phenyl-3-pyrazolidone.

19. The process as claimed in claim 10, wherein said first nontanning developing agent is selected from the class consisting of p-methylaminophenol and 1-phenyl-3-pyrazolidone.

20. The process as claimed in claim 1 wherein said phenol derivative is 2-(2′,4′-t-amylphenoxyacetamido)-4,6-dichloro-5-methyl-phenol.

21. The process as claimed in claim 9 wherein said phenol derivative is 2-(2′,4′-t-amylphenoxyacetamido)-4,6-dichloro-5-methyl-phenol.

22. The process as claimed in claim 1 wherein said α-naphthol derivative is selected from the class consisting of 2,4-dichloro-5-(p-toluene-sulfonylamino)-1-naphthol, N-[2-(o-acetamidophenyl)ethyl]-1-hydroxy-2-naphthamide and N-n-dodecyl-1-hydroxy-4-chloro-2-naphthamide.

23. The process as claimed in claim 9 wherein said β-naphthol derivative is selected from the class consisting of 2,4-dichloro-5-(p-toluene-sulfonylamino)-1-naphthol, N-[2-(o-acetamidophenyl)ethyl]-1-hydroxy-2-naphthamide and N-n-dodecyl-1-hydroxy-4-chloro-2-naphthamide.

24. The process as claimed in claim 1 wherein said acetanilide is 3-benzoylacetamino-4-methoxy-dodecylbenzoate.

25. The process as claimed in claim 9 wherein said acetanilide is 3-benzoylacetamino-4-methoxy-dodecylbenzoate.

26. The process as claimed in claim 15 wherein said derivative of p-phenylenediamine is selected from the class consisting of 4-amino-N,N-diethylaniline, 4-amino-3-methyl-N,N-diethylaniline and 4-amino-3-methyl-N-ethyl-(β-methyl-sulfonamidoethyl)-aniline.

27. The process as claimed in claim 16 wherein said derivative of p-phenylenediamine is selected from the class consisting of 4-amino-N,N-diethylaniline, 4-amino-3-methyl-N,N-diethylaniline and 4-amino-3-methyl-N-ethyl-(β-methyl-sulfonamidoethyl)-aniline.

28. The process as claimed in claim 10 wherein said phenol derivative is 2-(2′,4′-di-t-amylphenoxyacetamido)-4,6-dichloro-5-methyl-phenol.

29. The process as claimed in claim 10 wherein said α-naphthol derivative is selected from the class consisting of 2,4-dichloro-5-(p-toluenesulfonylamino)-1-naphthol, N-[2-(o-acetamidophenyl)ethyl]-1-hydroxy-2-naphthamide and N-n-dodecyl-1-hydroxy-4-chloro-2-naphthamide.

30. The process as claimed in claim 10 wherein said acetanilide is 3-benzoylacetamino-4-methoxy-dodecyl-benzoate.